(12) United States Patent
Nishihama et al.

(10) Patent No.: US 11,716,039 B2
(45) Date of Patent: Aug. 1, 2023

(54) WINDING SWITCHING DEVICE AND ROTATING ELECTRICAL MACHINE DRIVE SYSTEM USING THE SAME

(71) Applicant: Hitachi Astemo, Ltd., Hitachinaka (JP)

(72) Inventors: Kazuo Nishihama, Tokyo (JP); Akeshi Takahashi, Tokyo (JP); Katsuhiro Hoshino, Hitachinaka (JP); Noriyuki Maekawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 5 days.

(21) Appl. No.: 17/642,522

(22) PCT Filed: Aug. 14, 2020

(86) PCT No.: PCT/JP2020/030847
§ 371 (c)(1),
(2) Date: Mar. 11, 2022

(87) PCT Pub. No.: WO2021/049249
PCT Pub. Date: Mar. 18, 2021

(65) Prior Publication Data
US 2022/0337184 A1  Oct. 20, 2022

(30) Foreign Application Priority Data

Sep. 12, 2019  (JP) ............... JP2019-166246

(51) Int. Cl.
  *H02K 17/16*   (2006.01)
  *H02P 25/18*   (2006.01)
  (Continued)

(52) U.S. Cl.
  CPC ............... *H02P 25/18* (2013.01); *H02K 7/20* (2013.01); *H02P 25/22* (2013.01); *H02P 27/06* (2013.01)

(58) Field of Classification Search
  CPC .......... H02P 25/18; H02P 25/22; H02P 27/06; H02P 25/188
  See application file for complete search history.

(56) References Cited

U.S. PATENT DOCUMENTS

| 11,283,389 B2 * | 3/2022 | Kimura ..................... H02P 6/12 |
| 2021/0044238 A1 * | 2/2021 | Takahashi ............. H02P 25/188 |

FOREIGN PATENT DOCUMENTS

| JP | 61-43831 B2 | 9/1986 |
| JP | 2009-278841 A | 11/2009 |

(Continued)

OTHER PUBLICATIONS

International Search Report (PCT/ISA/210) issued in PCT Application No. PCT/JP2020/030847 dated Nov. 10, 2020 with English translation (four (4) pages).

(Continued)

*Primary Examiner* — Muhammad S Islam
(74) *Attorney, Agent, or Firm* — Crowell & Moring LLP

(57) ABSTRACT

An object of the present invention is to provide a winding switching device capable of enhancing the reliability of electrical contact between a movable unit and a fixed unit, and a rotating electrical machine drive system including such a winding switching device. A winding switching device switches a connection state of a plurality of windings, and includes a plurality of electrodes to which the plurality of windings are connected; a movable unit that includes a plurality of conductor portions in contact with the plurality of electrodes, and that is driven in a predetermined direction in which the plurality of electrodes are arranged; and a fixed unit including a regulating portion that regulates movement of the movable unit in the predetermined direction; where the connection states of the plurality of windings are switched according to the position of the movable unit; and when the movable unit moves in the predetermined direc- (Continued)

tion, the plurality of conductors are displaced in a direction of moving away from the plurality of electrodes by the regulating portion.

12 Claims, 9 Drawing Sheets

(51) Int. Cl.
*H02K 7/20* (2006.01)
*H02P 25/22* (2006.01)
*H02P 27/06* (2006.01)

(56) References Cited

FOREIGN PATENT DOCUMENTS

JP         2017-70112 A     4/2017
WO    WO 2019/167379 A1    9/2019

OTHER PUBLICATIONS

Japanese-language Written Opinion (PCT/ISA/237) issued in PCT Application No. PCT/JP2020/030847 dated Nov. 10, 2020 (three (3) pages).

* cited by examiner

WINDING SWITCHING DEVICE AND ROTATING ELECTRICAL MACHINE DRIVE SYSTEM USING THE SAME

TECHNICAL FIELD

The present invention relates to a winding switching device that switches a connection state of a plurality of windings, and a rotating electrical machine drive system including the winding switching device.

BACKGROUND ART

A technique for switching a wire connection state of windings to make output characteristics of an electric motor, which is a rotating electrical machine, different between a high speed range and a low speed range is known.

For example, a winding switching device described in PTL 1 includes a device main body including a plurality of electrodes to which ends of a plurality of windings are connected, a movable unit including a series wire connection circuit section and a parallel wire connection circuit section arranged in a switching direction, and a drive device that operates a movable body in the switching direction. When the movable body is operated by the drive device and the electrode of the device main body comes into contact with the electrode of the series wire connection circuit section and the electrode of the parallel wire connection circuit section movable body in the movable body, the windings of the electric motor are connected in the series state and the parallel state, respectively.

As a technique for switching an electrical connection state between loads including a power supply and a winding, a conventional technique described in PTL 2 is known. In the present technique, a movable switching contact to which a high frequency oscillator is electrically connected to any of a plurality of fixed contacts to which a plurality of induction heating coils are connected. When the movable switching contact is driven by an air cylinder, the induction heating coil connected to the high frequency oscillator is switched. At this time, the movable switching contact is separated from the fixed contact by the action of the spring, and the movable switching contact moves without sliding with respect to the stator contact.

CITATION LIST

Patent Literature

PTL 1: JP 2017-70112 A
PTL 2: JP 61-43831 B2

SUMMARY OF INVENTION

Technical Problem

In the winding switching device described in PTL 1, since the electrode of the movable body slides with respect to the electrode of the device main body, wear or damage of the electrode may occur. Furthermore, when the external power for driving the movable body is lost, the reliability of electrical contact between the electrode of the device main body and the electrode of the movable body degrades.

In the technique described in PTL 2, the movable switching contact moves without sliding with respect to the stator contact, and hence wear and damage on the movable switching contact and the stator contact can be suppressed. However, when the driving force of the movable switching contact is lost due to the abnormality of the air cylinder, the reliability of the electrical contact between the movable contact and the fixed contact degrades.

Therefore, the present invention provides a winding switching device capable of enhancing the reliability of electrical contact between a movable unit and a fixed unit, and a rotating electrical machine drive system including such a winding switching device.

Solution to Problem

In order to solve the above problems, a winding switching device according to the present invention switches a connection state of a plurality of windings, and includes a plurality of electrodes to which the plurality of windings are connected; a movable unit that includes a plurality of conductor portions in contact with the plurality of electrodes, and that is driven in a predetermined direction in which the plurality of electrodes are arranged; and a fixed unit including a regulating portion that regulates movement of the movable unit in the predetermined direction, wherein the connection states of the plurality of windings are switched according to the position of the movable unit, and when the movable unit moves in the predetermined direction, the plurality of conductors are displaced in a direction of moving away from the plurality of electrodes by the regulating portion.

In order to solve the above problem, a winding switching device according to the present invention includes a plurality of winding switching units for switching connection states of a plurality of windings, wherein the winding includes a plurality of unit windings, the winding switching unit switches the connection states of the plurality of unit windings, and includes a plurality of electrodes to which the plurality of unit windings are connected, a movable unit that includes a plurality of conductor portions in contact with the plurality of electrodes, and that is driven in a predetermined direction in which the plurality of electrodes are arranged, and a fixed unit including a regulating portion that regulates movement of the movable unit in the predetermined direction, the connection states of the plurality of unit windings are switched according to the position of the movable unit, and when the movable unit moves in the predetermined direction, the plurality of conductors are displaced in a direction of moving away from the plurality of electrodes by the regulating portion.

In order to solve the above problems, a rotating electrical machine drive system according to the present invention includes a rotating electrical machine; an inverter that outputs AC power to the rotating electrical machine; and a winding switching device connected between the rotating electrical machine and the inverter, wherein the winding switching device is the winding switching device according to the present invention.

Advantageous Effects of Invention

According to the present invention, reliability of electrical contact between the conductor portion of the movable unit and the electrode to which the winding is connected is enhanced. Furthermore, the reliability of the operation of the rotating electrical machine drive system including the winding switching device is enhanced.

Problems, configurations, and effects other than those described above will be clarified by the description of the following embodiments.

DESCRIPTION OF EMBODIMENTS

Figure 1:
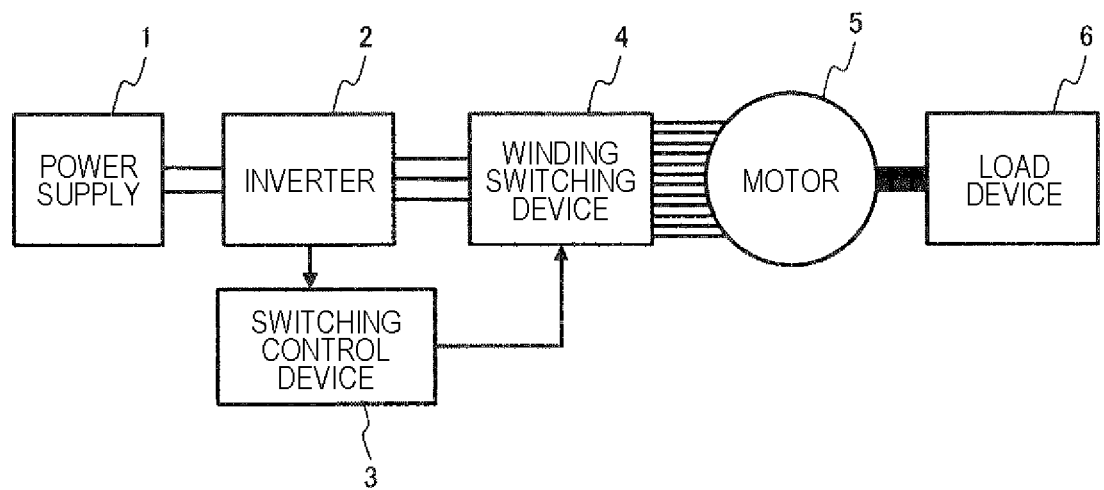
FIG. 1 is a block diagram illustrating a schematic configuration of an EV driving variable speed operation system according to a first embodiment.

Hereinafter, embodiments of the present invention will be described according to the first to eighth embodiments below with reference to the drawings. In the drawings, the same reference numerals indicate the same components or components having similar functions.

First Embodiment

FIG. 1 is a block diagram illustrating a schematic configuration of an EV driving variable speed operation system according to a first embodiment of the present invention.

The present EV driving variable speed operation system is an example of a rotating electrical machine drive system, and drives a motor (e.g., permanent magnet synchronous electric motor or the like) mounted on an EV (Electric Vehicle) at a variable speed.

As illustrated in FIG. 1, the variable speed operation system of the present embodiment includes a power supply 1, an inverter 2, a switching control device 3, a winding switching device 4, a motor 5, and a load device 6.

The inverter 2 is a power converter that converts DC power input from the power supply 1 into three-phase AC power and outputs the three-phase AC power to the motor 5 via the winding switching device 4. That is, the inverter 2 functions as a driver that drives the motor 5 by supplying AC power to each phase of the motor 5 via the winding switching device 4.

The winding switching device 4 switches the winding connection state of the three-phase windings of the motor 5 according to a command signal from the switching control device 3. As a result, the output characteristics of the motor 5 are made different between the high speed range and the low speed range.

The switching control device 3 generates a command signal for switching the winding connection state in the three-phase winding of the motor 5 according to the speed of the motor 5, and outputs the command signal to the winding switching device 4.

The motor 5 is a three-phase AC electric motor. In the first embodiment, the motor 5 is a permanent magnet synchronous electric motor. The motor 5 drives the load device 6 (wheel drive mechanism of the EV in the first embodiment).

Figure 2:
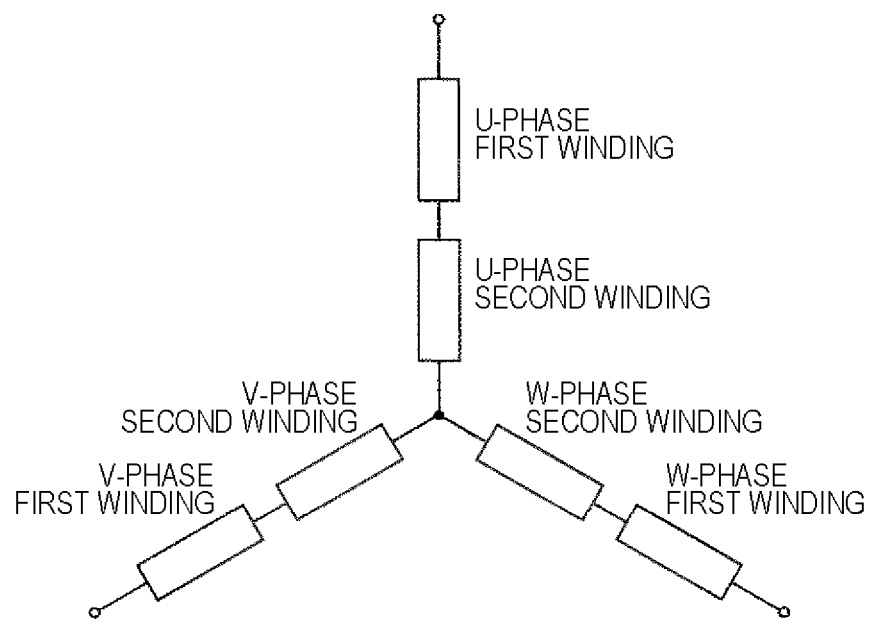
FIG. 2 is a diagram illustrating a three-phase winding in a stator of a motor 5 (series connection).
Figure 3:
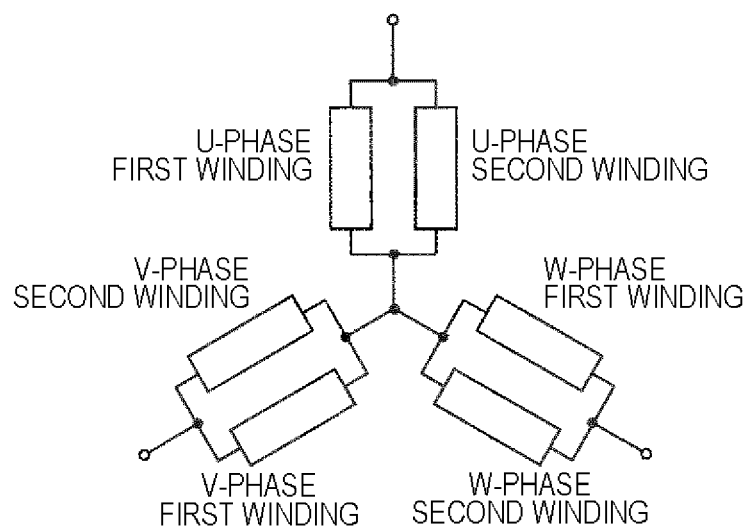
FIG. 3 is a diagram illustrating a three-phase winding in a stator of the motor 5 (parallel connection).

FIGS. 2 and 3 are diagrams illustrating three-phase windings in the stator of the motor 5.

As illustrated in FIGS. 2 and 3, each phase windings of the U-phase, V-phase, and W-phase of the motor 5 include a plurality of (two in FIGS. 2 and 3) unit windings, for example, a U-phase first winding and a U-phase second winding in the U-phase. In each winding of the U-phase, V-phase, and W-phase, the two unit windings are connected in series (FIG. 2) or in parallel (FIG. 3).

In response to a command from the switching control device 3, the winding switching device 4 sets the connection state of the unit winding in each phase winding of the U-phase, V-phase, and W-phase to either series connection (FIG. 2) or parallel connection (FIG. 3), and switches between the series connection and the parallel connection.

Figure 16:
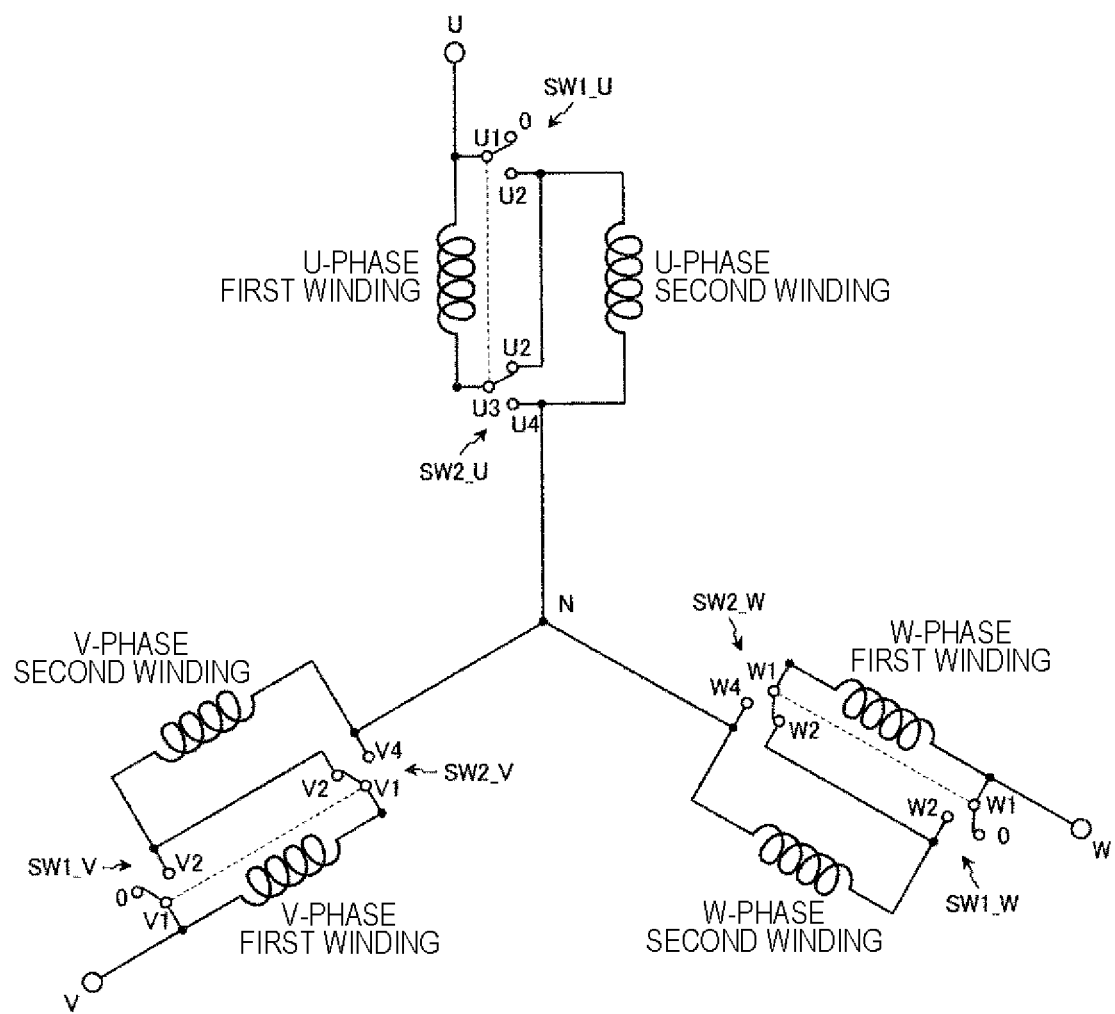
FIG. 16 is a circuit diagram illustrating a circuit configuration example of a winding switching device according to the first embodiment.

FIG. 16 is a circuit diagram illustrating a circuit configuration example of the winding switching device 4 according to the first embodiment.

As illustrated in FIG. 16, the winding switching device 4 is configured by changeover switches SW1_U, SW2_U, SW1_V, SW2_V, SW1_W, and SW2_W.

In the U phase, the changeover switch SW1_U opens and closes an electrical connection between a terminal U1 (corresponding to a fixed terminal electrode U1 to be described later) to which one end of the U-phase first winding and the U-phase terminal U are electrically connected and a terminal U2 (corresponding to a fixed terminal electrode U2 to be described later) to which the U-phase second winding is electrically connected. In addition, the changeover switch SW2_U electrically connects a terminal U3 (corresponding to a fixed terminal electrode U3 to be described later) to which the other end of the U-phase first winding is electrically connected to either the terminal U2 (corresponding to a fixed terminal electrode U2 to be described later) or a terminal U4 (corresponding to a fixed terminal electrode U4 to be described later) to which the other end of the U-phase second winding and the neutral point N are electrically connected.

The changeover switches SW1_U and SW2_U operate in cooperation. At this time, as illustrated in FIG. 16, when the changeover switch SW1_U electrically disconnects the terminal U1 and the terminal U2 and the changeover switch SW2_U electrically connects the terminal U3 to the terminal U2, the U-phase first winding and the U-phase second winding are electrically connected in series. In addition, when the changeover switch SW1_U electrically connects the terminal U1 and the terminal U2 and the changeover switch SW2_U electrically connects the terminal U3 to the terminal U4, the U-phase first winding and the U-phase second winding are electrically connected in parallel.

The operations of the changeover switches SW1_V and SW2_V in the V phase and the operations of the changeover switches SW1_W and SW2_W in the W phase are similar to those of the changeover switches SW1_U and SW2_U in the U phase described above.

As illustrated in FIG. 2, by connecting two unit windings forming each phase winding in series, the efficiency of the inverter 2 when the motor 5 is driven at a low speed can be made higher than that at the time of parallel connection. This is because, by connecting the windings in series, the voltage when the motor 5 is driven at a low speed can be made higher than that at the time of parallel connection, and the current when the motor 5 is driven at a low speed can be made smaller than that at the time of parallel connection. On the other hand, as illustrated in FIG. 3, by connecting two unit windings forming each phase winding in parallel, the efficiency of the inverter 2 when the motor 5 is driven at a high speed can be made higher than that at the time of series connection.

Hereinafter, the configuration and operation of the winding switching device 4 according to the first embodiment will be described with reference to FIGS. 4 to 6. The winding switching device 4 has the circuit configuration of FIG. 16 described above.

Figure 4:
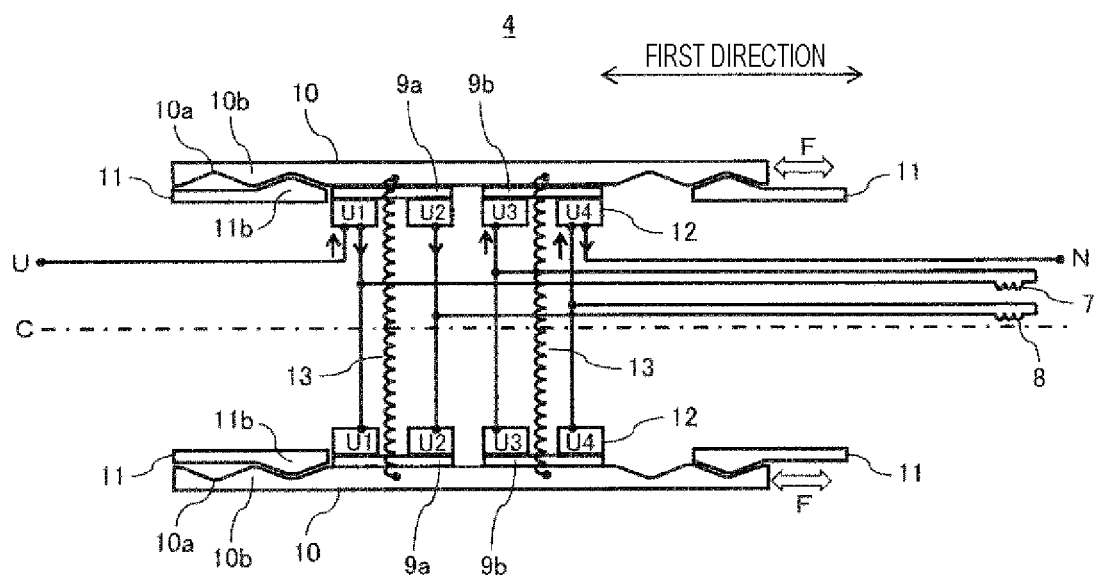
FIG. 4 is a configuration diagram of a main part of a winding switching device according to the first embodiment (parallel connection).
Figure 5:
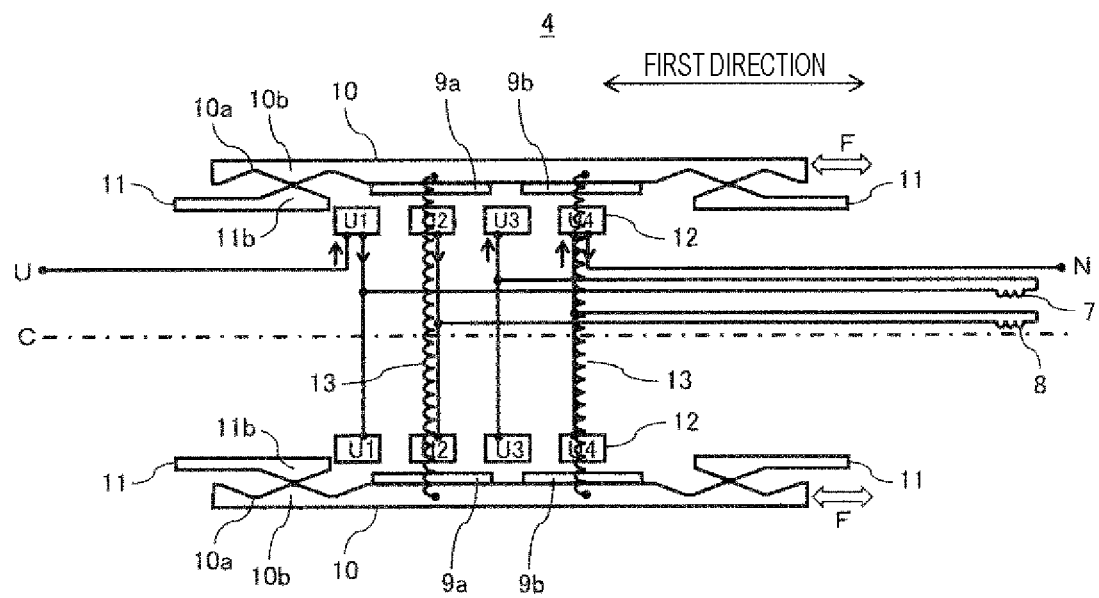
FIG. 5 is a configuration diagram of a main part of the winding switching device according to the first embodiment (during switching).
Figure 6:
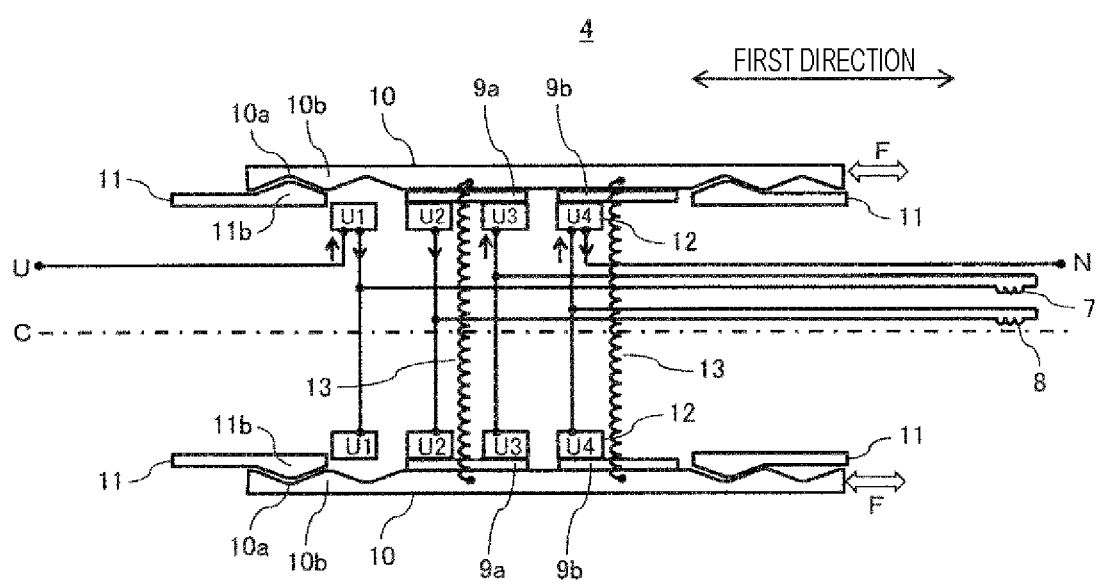
FIG. 6 is a configuration diagram of a main part of the winding switching device according to the first embodiment (series connection).

FIG. 4 is a configuration diagram of a main part of the winding switching device 4 according to the first embodiment (the same applies to FIGS. 5 to 6). FIG. 4 illustrates a U-phase winding switching unit in the winding switching device 4 (the same applies to FIGS. 5 to 6). The configurations of the V-phase winding switching unit and the W-phase winding switching unit are similar to the configuration of the U-phase winding switching unit.

The winding switching device 4 sets the connection state of the U-phase first winding 7 and the U-phase second winding 8 to either series connection (FIG. 2) or parallel connection (FIG. 3), and switches between the series connection and the parallel connection. In FIG. 4, the U-phase first winding 7 and the U-phase second winding 8 are connected in parallel by the winding switching device 4.

The winding switching device 4 includes a movable element 10 including movable short-circuit portions 9a and 9b made of a conductor and electrically connecting the U-phase first winding 7 and the U-phase second winding 8, and a stator 11 including a plurality of fixed conductor portions 12 to which the U-phase first winding 7 and the U-phase second winding 8 are electrically connected. In FIG. 4, the plurality of fixed conductor portions 12 include fixed terminal electrodes U1 and U3 to which both ends of the U-phase first winding 7 are electrically connected, and fixed terminal electrodes U2 and U4 to which both ends of the U-phase second winding 8 are electrically connected. The fixed terminal electrode U1 is also electrically connected to the U-phase terminal U of the three-phase winding of the motor 5. The fixed terminal electrode U4 is also electrically connected to the neutral point N of the three-phase winding of the motor 5.

As illustrated in FIG. 4, the winding switching device 4 of the first embodiment has a vertically symmetrical configuration in FIG. 4 with respect to an imaginary center line C (one-dot chain line) in the figure. The pair of upper and lower stators 11 is located in the space between the pair of upper and lower movable elements.

Here, in FIG. 4, a direction in which the fixed terminal electrodes U1, U2, U3, and U4 are arranged side by side in this order, that is, a direction parallel to a virtual line segment connecting the fixed terminal electrodes U1, U2, U3, and U4 is defined as a first direction (the same applies to FIGS. 5 to 10). The first direction is a direction in which the movable element 10 is driven by the external power F.

When the movable element 10 is driven along the first direction by the external power F applied by an operation device (not illustrated), the electrical connection state between the U-phase first winding 7 and the U-phase second winding 8 is switched as described later (FIGS. 5 and 6). An electrical operation device and the like including a solenoid can be applied as the operation device.

In FIG. 4, the movable short-circuit portion 9a short-circuits between the fixed terminal electrode U1 to which one end of the U-phase first winding 7 is connected and the fixed terminal electrode U2 to which one end of the U-phase second winding is connected, and the movable short-circuit portion 9b short-circuits between the fixed terminal electrode U3 to which the other end of the U-phase first winding 7 is connected and the fixed terminal electrode U4 to which the other end of the U-phase second winding 8 is connected. Thus, the U-phase first winding 7 and the U-phase second winding 8 are connected in parallel.

The movable element 10 has concave-convex portion (10a, 10b) along the first direction on surfaces facing the stator 11 located on both sides of a support portion of the fixed terminal electrodes U1, U2, U3, and U4. The concave portion 10a and the convex portion 10b are adjacent to each other, and as shown in FIG. 4, the surface of the concave-convex portion has a triangular wave shape at a cross section in a direction perpendicular to the first direction of the concave-convex portion.

In addition, the stator 11 has convex portions 11b on surfaces facing the stator 11 located on both sides of the support portion of the fixed terminal electrodes U1, U2, U3, and U4. As illustrated in FIG. 4, when the U-phase first winding 7 and the U-phase second winding 8 are connected in parallel, the concave portion 10a of the movable element 10 and the convex portion 11b of the stator 11 are fitted to each other and come into contact with each other. Therefore, the movement of the movable element 10 along the first direction is regulated by the convex portion 11b of the stator 11. That is, the convex portion 11b of the stator 11 functions as a regulating portion that regulates the movement of the movable element 10.

According to such a regulating portion, the movement of the movable element 10 in the first direction, that is, the movement of the movable short-circuit portions 9a and 9b is regulated, and hence the parallel connection state of the U-phase first winding 7 and the U-phase second winding is held. Therefore, even if the external power F is lost due to an abnormality of the operation device or the like, the parallel connection state of the U-phase first winding 7 and the U-phase second winding is maintained. That is, the winding switching device 4 of the first embodiment has a so-called fail-safe function.

In addition, a tension spring 13 is connected between the pair of movable elements 10 arranged to be in line-symmetric with respect to the virtual center line C. The tension spring 13 applies a biasing force to the pair of movable elements 10 in a direction perpendicular to the first direction and in a direction in which the pair of movable elements 10 are attracted to each other.

Therefore, since the fitting between the concave portion 10a of the movable element 10 and the convex portion 11b of the stator 11 is less likely to be released, the parallel connection state of the U-phase first winding 7 and the U-phase second winding is reliably held unless the external power F is applied to the movable element 10. Therefore, even if the external power F is lost due to an abnormality of the operation device or the like, the parallel connection state of the U-phase first winding 7 and the U-phase second winding is reliably maintained together with the above-described regulating portion.

FIG. 5 is a configuration diagram of a main part of the winding switching device 4 according to the first embodiment. FIG. 5 illustrates a state of the winding switching device 4 in the middle of switching the connection between the U-phase first winding 7 and the U-phase second winding 8 from the parallel connection (FIG. 4) to the series connection (FIG. 6).

In the parallel connection state illustrated in FIG. 4, when external power is applied to the movable element 10 in the right direction in FIG. 5, that is, in the direction from the movable short-circuit portion 9a toward the movable short-circuit portion 9b along the first direction, the movable element 10 slides on the stator 11 in the direction of the external power while contacting the stator 11. At this time, the movable element 10 moves along the first direction, and as the tension spring extends, and the sliding surface of the movable element 10 has the concave portion 10a and the convex portion 10b and the sliding surface of the stator 11 has the convex portion 11b, that is, the regulating portion while the contact between the movable element 10 and the stator 11 is maintained, it is displaced in a direction perpendicular to the first direction with respect to the stator 11 and in a direction away from the stator 11. That is, the movable element 10 moves in an oblique direction having an angle with respect to the first direction.

Therefore, as illustrated in FIG. 5, the movable short-circuit portions 9a and 9b are separated from the fixed conductor portion 12, that is, the fixed terminal electrodes U1 to U4, and the movable short-circuit portions 9a and 9b and the fixed terminal electrodes U1 to U4 are released from the contact state and are not in contact with each other.

Therefore, when the connection between the U-phase first winding 7 and the U-phase second winding 8 is switched from the parallel connection (FIG. 4) to the series connection (FIG. 6), the movable short-circuit portions 9a and 9b and the fixed terminal electrodes U1 to U4 do not slide with each other, and wear or damage of the movable short-circuit portions 9a and 9b and the fixed terminal electrodes U1 to U4 is prevented.

FIG. 6 is a configuration diagram of a main part of the winding switching device 4 according to the first embodiment. In FIG. 6, the U-phase first winding 7 and the U-phase second winding 8 are connected in series.

In the state of FIG. 5, when the external power is continuously applied to the movable element 10, the movable element 10 continues to move along the first direction (right direction in the figure), and as the tension spring contracts, and the sliding surface of the movable element 10 has the concave portion 10a and the convex portion 10b and the sliding surface of the stator 11 has the convex portion 11b, that is, the regulating portion while the contact between the movable element 10 and the stator 11 is maintained, it is displaced in the direction perpendicular to the first direction with respect to the stator 11 and in the direction approaching the stator 11.

Therefore, as illustrated in FIG. 6, the movable short-circuit portion 9a is released from contact with the fixed terminal electrode U1 in the state of FIG. 4 and comes into contact with the fixed terminal electrodes U2 and U3, and the movable short-circuit portion 9b is released from contact with the fixed terminal electrode U3 in the state of FIG. 4 and comes into contact with the fixed terminal electrode U4. Therefore, the fixed terminal electrode U1 and the fixed terminal electrode U4 are respectively electrically disconnected from one end of the U-phase second winding 8 and the other end of the U-phase first winding, and the one end of the U-phase second winding 8 and the other end of the U-phase first winding 7 are electrically connected by the movable short-circuit portion 9a. Thus, the U-phase first winding 7 and the U-phase second winding 8 are connected in series.

Even in the state illustrated in FIG. 6, the movement of the movable element 10 in the first direction, that is, the movement of the movable short-circuit portions 9a and 9b is regulated by the regulating portion (convex portion 11b) provided on the stator 11, so that the series connection state of the U-phase first winding 7 and the U-phase second winding is held. Therefore, even if the external power F is lost due to an abnormality of the operation device or the like, the series connection state of the U-phase first winding 7 and the U-phase second winding is maintained. That is, the winding switching device 4 of the first embodiment has a so-called fail-safe function.

Even in the state illustrated in FIG. 6, since the fitting between the concave portion 10a of the movable element 10 and the convex portion 11b of the stator 11 is less likely to be released by the biasing force of the tension spring 13, the series connection state of the U-phase first winding 7 and the U-phase second winding is reliably held unless the external power F is applied to the movable element 10. Therefore, even if the external power F is lost due to an abnormality of the operation device or the like, the series connection state of the U-phase first winding 7 and the U-phase second winding is reliably maintained together with the above-described regulating portion.

When the connection state of the U-phase first winding 7 and the U-phase second winding is switched from the series connection to the parallel connection, the state of the winding switching device 4 transitions in the order of FIGS. 6, 5, and 4 contrary to the case described above, but the operation of the winding switching device 4 is similar to the operation described above.

As described above, according to the first embodiment, the connection state between the U-phase first winding 7 and the U-phase second winding is held by the regulating portion (convex portion 11b) provided on the stator 11. Therefore, even if the external power F is lost, the connection state between the U-phase first winding 7 and the U-phase second winding can be maintained, so that the winding switching device 4 can have a fail-safe function. Furthermore, the connection state between the U-phase first winding 7 and the U-phase second winding is reliably held by the biasing force of the tension spring 13. Therefore, even if the external power F is lost, the connection state between the U-phase first winding 7 and the U-phase second winding can be reliably maintained.

Second Embodiment

Next, a second embodiment of the present invention will be described with reference to FIGS. 7 to 9. Hereinafter, points different from the first embodiment will be mainly described, and description on points common with the first embodiment will be omitted.

Figure 7:
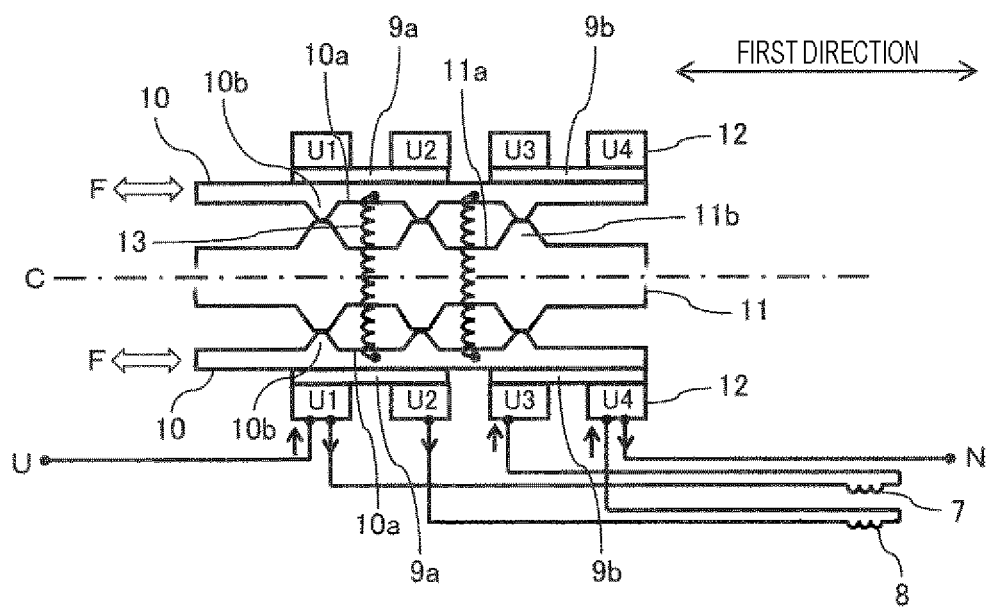
FIG. 7 is a configuration diagram of a main part of a winding switching device according to a second embodiment (parallel connection).
Figure 8:
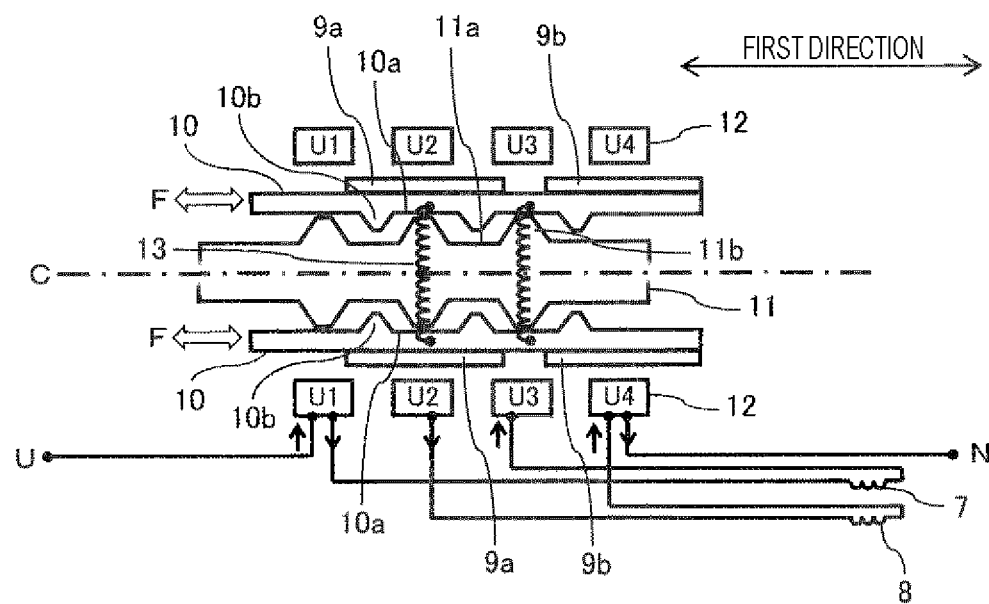
FIG. 8 is a configuration diagram of a main part of a winding switching device according to the second embodiment (during switching).
Figure 9:
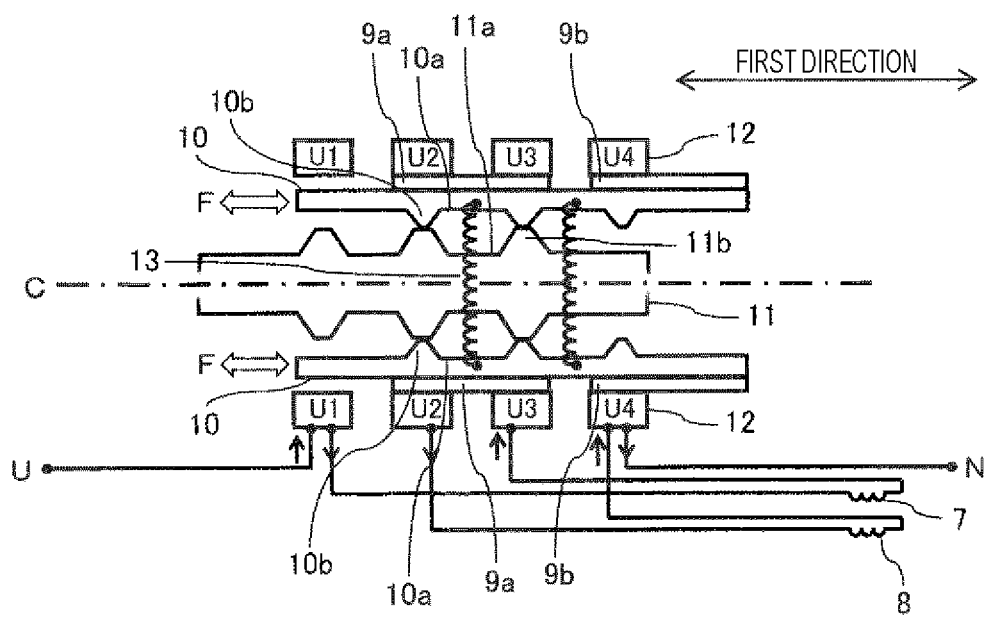
FIG. 9 is a configuration diagram of a main part of a winding switching device according to the second embodiment (series connection).

FIG. 7 is a configuration diagram of a main part of a winding switching device 4 according to the second embodiment (the same applies to FIGS. 8 to 9). In FIG. 7, the U-phase first winding 7 and the U-phase second winding 8 are connected in parallel by the winding switching device 4 as in FIG. 4.

FIG. 7 illustrates a U-phase winding switching unit in the winding switching device 4 (the same applies to FIGS. 8 to 9). The configurations of the V-phase winding switching unit and the W-phase winding switching unit are similar to the configuration of the U-phase winding switching unit.

In the second embodiment, the convex portion 11b (regulating portion) of the stator 11 is located in the inner space between the pair of upper and lower movable elements 10 in the drawing. Furthermore, the fixed terminal electrodes U1 to U4 in the stator 11 are located in the outer space of the pair of upper and lower movable elements 10. The convex portion 11b has a flat part at its distal end.

Although not illustrated in the drawings, the fixed terminal electrodes U1, U2, U3, and U4 on the upper side are electrically connected to one end of the U-phase first winding, one end of the U-phase second winding, the other end of the U-phase first winding, and the other end of the U-phase second winding, respectively, similarly to the fixed terminal electrodes U1, U2, U3, and U4 on the upper side. Furthermore, although not illustrated, the fixed terminal electrodes U1 and U4 on the upper side are electrically connected to the U-phase terminal U and the neutral point N of the three-phase winding, respectively.

In the movable element 10, the concave portion 10a and the convex portion 10b are located in the inner space between the pair of upper and lower movable elements 10. In the movable element 10, the movable short-circuit portions 9a and 9b are located in the outer space of the pair of upper and lower movable elements 10 and are located on the flat surface of the movable element 10. The convex portion 11b has a flat part at its distal end.

As illustrated in FIG. 7, in the parallel connection state of the U-phase first winding 7 and the U-phase second winding 8, the flat part of the convex portion 11b (regulating portion) of the stator 11 comes into surface contact with the flat part of the convex portion 10b of the movable element 10 in the inner space between the pair of upper and lower movable elements 10. As a result, the movable short-circuit portion 9a is pressed against the fixed terminal electrodes U1 and U2, and the movable short-circuit portion 9b is pressed against the fixed terminal electrodes U3 and U4.

According to such a pressing force by the regulating portion, the movement of the movable element 10 in the first direction, that is, the movement of the movable short-circuit portions 9a and 9b is regulated, so that the parallel connection state of the U-phase first winding 7 and the U-phase second winding is held. Therefore, even if the external power F is lost due to an abnormality of the operation device or the like, the parallel connection state of the U-phase first winding 7 and the U-phase second winding is maintained. That is, the winding switching device 4 of the second embodiment has a so-called fail-safe function.

Furthermore, the biasing force of the tension spring 13 applies a surface pressure to the contact surface between the flat part of the convex portion 11b (regulating portion) of the stator 11 and the flat part of the convex portion 10b of the movable element 10. Thus, surface contact between the flat part of the convex portion 11b (regulating portion) of the stator 11 and the flat part of the convex portion 10b of the movable element 10 is reliably held.

Therefore, if the external power F is not applied to the movable element 10, the parallel connection state of the U-phase first winding 7 and the U-phase second winding is reliably held. Therefore, even if the external power F is lost due to an abnormality of the operation device or the like, the parallel connection state of the U-phase first winding 7 and the U-phase second winding is reliably maintained together with the above-described regulating portion.

FIG. 8 is a configuration diagram of a main part of the winding switching device 4 according to the second embodiment. FIG. 8 illustrates a state of the winding switching device 4 in the middle of switching the connection between the U-phase first winding 7 and the U-phase second winding 8 from the parallel connection (FIG. 7) to the series connection (FIG. 9).

In the parallel connection state illustrated in FIG. 7, when external power F is applied to the movable element 10 in the right direction in FIG. 8, that is, in the direction from the movable short-circuit portion 9a toward the movable short-circuit portion 9b along the first direction, the movable element 10 slides on the stator 11 in the direction of the external power while contacting the stator 11. Then, as illustrated in FIG. 8, the bottom part of the concave portion 10a of the movable element 10 and the flat part at the distal end of the convex portion 11b (regulating portion) of the stator 11 come into contact with each other. At this time, the movable element 10 moves along the first direction, and as the tension spring contracts, it is displaced in a direction perpendicular to the first direction with respect to the stator 11 and in a direction in which the pair of movable elements 10 approach each other while the contact between the movable element 10 and the stator 11 is maintained.

Therefore, as illustrated in FIG. 8, the movable short-circuit portions 9a and 9b are separated from the fixed conductor portion 12, that is, the fixed terminal electrodes U1 to U4, and the movable short-circuit portions 9a and 9b and the fixed terminal electrodes U1 to U4 are released from the contact state and are not in contact with each other.

Therefore, when the connection between the U-phase first winding 7 and the U-phase second winding 8 is switched from the parallel connection (FIG. 7) to the series connection (FIG. 9), the movable short-circuit portions 9a and 9b and the fixed terminal electrodes U1 to U4 do not slide with each other, and wear or damage of the movable short-circuit portions 9a and 9b and the fixed terminal electrodes U1 to U4 is prevented.

As illustrated in FIG. 8, in the second embodiment, the bottom part of the concave portion 10a of the movable element 10 and the flat part of the distal end of the convex portion 11b (regulating portion) of the stator 11 are in contact with each other, but the flat part of the distal end of the convex portion 10b of the movable element 10 and the bottom part of the concave portion between the convex portions 11b (regulating portion) of the stator 11 are not in contact with each other. That is, the height of the convex portion 10b of the movable element 10 from the bottom part of the concave portion 10a is smaller than the height of the convex portion 11b (regulating portion) of the stator 11 from the bottom part of the concave portion. Therefore, the distance between the movable short-circuit portions 9a and 9b and the fixed terminal electrodes U1 to U4 can be set by the height of the convex portion 10b of the movable element 10 from the bottom part of the concave portion 10a. Therefore, sliding between the movable short-circuit portions 9a and 9b and the fixed terminal electrodes U1 to U4 can be prevented with high reliability, so that wear and damage of the movable short-circuit portions 9a and 9b and the fixed terminal electrodes U1 to U4 are reliably prevented.

FIG. 9 is a configuration diagram of a main part of the winding switching device 4 according to the second embodiment. In FIG. 6, the U-phase first winding 7 and the U-phase second winding 8 are connected in series.

In the state of FIG. 8, when external power is continuously applied to the movable element 10, the movable element 10 continues to move along the first direction (right direction in the figure) while the contact between the concave portion 10a of the movable element 10 and the convex portion 11b of the stator 11 is maintained by the biasing force of the tension spring 13. Thereafter, when the convex portion 10b of the movable element 10 and the convex portion 11b of the stator 11 abut on each other, the tension spring 13 extends, and the movable element 10 moves along the first direction (right direction in the figure) while maintaining the contact of the convex portion 10b with the convex portion 11b, and thus, is displaced in the direction perpendicular to the first direction with respect to the stator 11 and in the direction approaching the fixed terminal electrodes U1 to U4.

As a result, as illustrated in FIG. 9, the movable short-circuit portion 9a is released from contact with the fixed terminal electrode U1 in the state of FIG. 7 and comes into contact with the fixed terminal electrodes U2 and U3, and the movable short-circuit portion 9b is released from contact with the fixed terminal electrode U3 in the state of FIG. 7 and comes into contact with the fixed terminal electrode U4. Therefore, the fixed terminal electrode U1 and the fixed terminal electrode U4 are respectively electrically disconnected from one end of the U-phase second winding 8 and the other end of the U-phase first winding, and the one end of the U-phase second winding 8 and the other end of the U-phase first winding 7 are electrically connected by the movable short-circuit portion 9a. Thus, the U-phase first winding 7 and the U-phase second winding 8 are connected in series.

As illustrated in FIG. 9, in the series connection state of the U-phase first winding 7 and the U-phase second winding 8 as well, the flat part of the convex portion 11b (regulating portion) of the stator 11 comes into surface contact with the flat part of the convex portion 10b of the movable element 10, similar to the case of the parallel connection state (FIG. 7). As a result, the movable short-circuit portion 9a is pressed against the fixed terminal electrodes U2 and U3, and the movable short-circuit portion 9b is pressed against the fixed terminal electrode U4.

According to such a pressing force by the regulating portion, the movement of the movable element 10 in the first direction, that is, the movement of the movable short-circuit portions 9a and 9b is regulated, so that the series connection state of the U-phase first winding 7 and the U-phase second winding is held. Therefore, even if the external power F is lost due to an abnormality of the operation device or the like, the series connection state of the U-phase first winding 7 and the U-phase second winding is maintained. That is, the winding switching device 4 of the second embodiment has a so-called fail-safe function.

Furthermore, the biasing force of the tension spring 13 applies a surface pressure to the contact surface between the flat part of the convex portion 11b (regulating portion) of the stator 11 and the flat part of the convex portion 10b of the movable element 10. Thus, surface contact between the flat part of the convex portion 11b (regulating portion) of the stator 11 and the flat part of the convex portion 10b of the movable element 10 is reliably held.

Therefore, if the external power F is not applied to the movable element 10, the series connection state of the U-phase first winding 7 and the U-phase second winding is reliably held. Therefore, even if the external power F is lost due to an abnormality of the operation device or the like, the series connection state of the U-phase first winding 7 and the U-phase second winding is reliably maintained together with the above-described regulating portion.

When the connection state of the U-phase first winding 7 and the U-phase second winding is switched from the series connection to the parallel connection, the state of the winding switching device 4 transitions in the order of FIGS. 6, 5, and 4 contrary to the case described above, but the operation of the winding switching device 4 is similar to the operation described above.

As described above, according to the second embodiment, the connection state between the U-phase first winding 7 and the U-phase second winding is held by the pressing force of the regulating portion (convex portion 11b) provided on the stator 11. Therefore, even if the external power F is lost, the connection state between the U-phase first winding 7 and the U-phase second winding can be maintained, so that the winding switching device 4 can have a fail-safe function.

Furthermore, according to the second embodiment, the contact state between the movable short-circuit portions 9a and 9b and the fixed terminal electrodes U1 to U4 is maintained by the pressing force of the regulating portion (the convex portion 11b). Therefore, even if the biasing force of the tension spring 13 changes over time, the influence is small. In the contact state of biasing force, even if the tension spring 13 deteriorates, the contact state between the movable short-circuit portions 9a and 9b and the fixed terminal electrodes U1 to U4 can be maintained. Therefore, the reliability of the winding switch enhances.

Third Embodiment

Next, a third embodiment of the present invention will be described with reference to FIGS. 10 to 12.

The configuration itself of the winding switching device of the third embodiment is similar to that of the second embodiment, but in the third embodiment, the movable element 10 is also driven by the pressing spring 14 in addition to the external power F.

Hereinafter, points different from the first and second embodiments will be mainly described, and description on points common with the first and second embodiments will be omitted.

Figure 10:
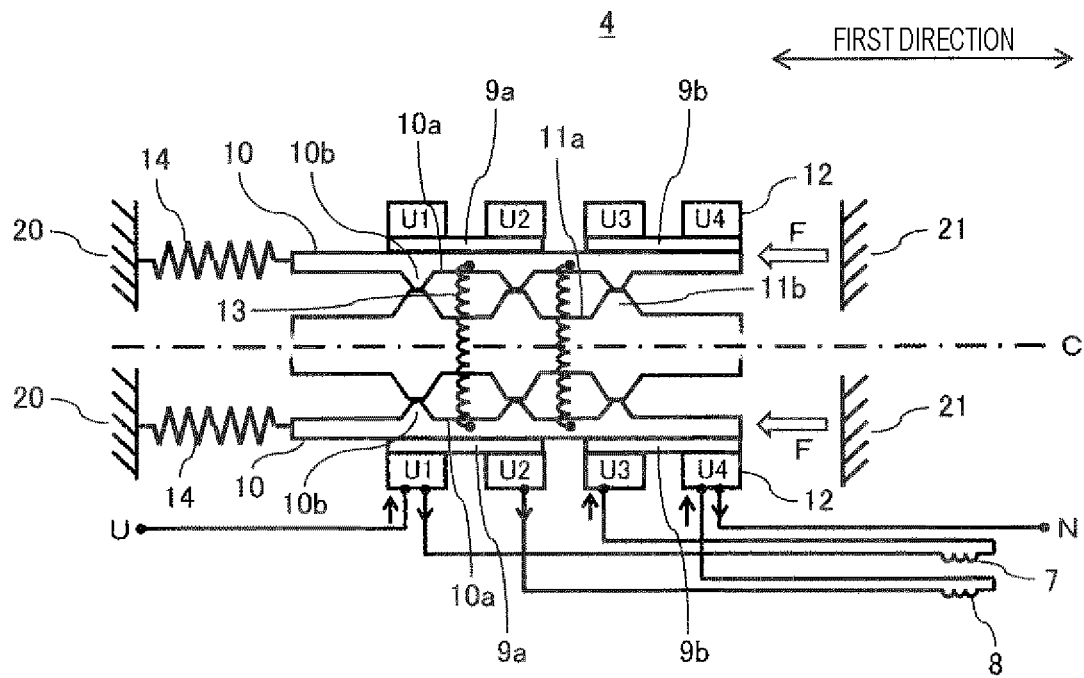
FIG. 10 is a configuration diagram of a main part of a winding switching device according to a third embodiment (parallel connection).
Figure 11:
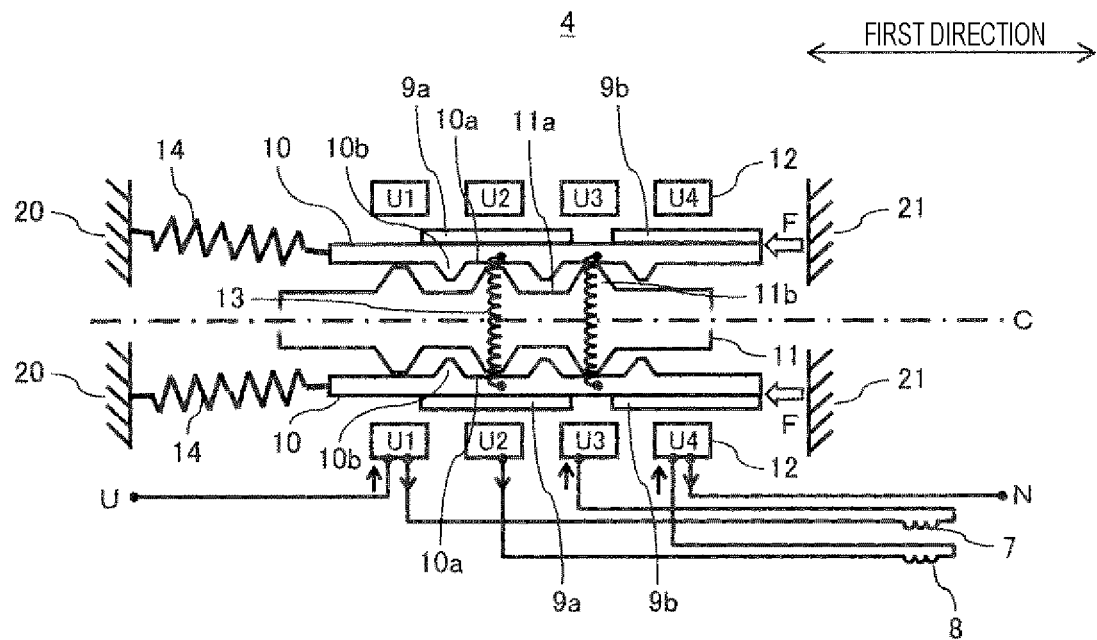
FIG. 11 is a configuration diagram of a main part of a winding switching device according to a third embodiment (during switching).
Figure 12:
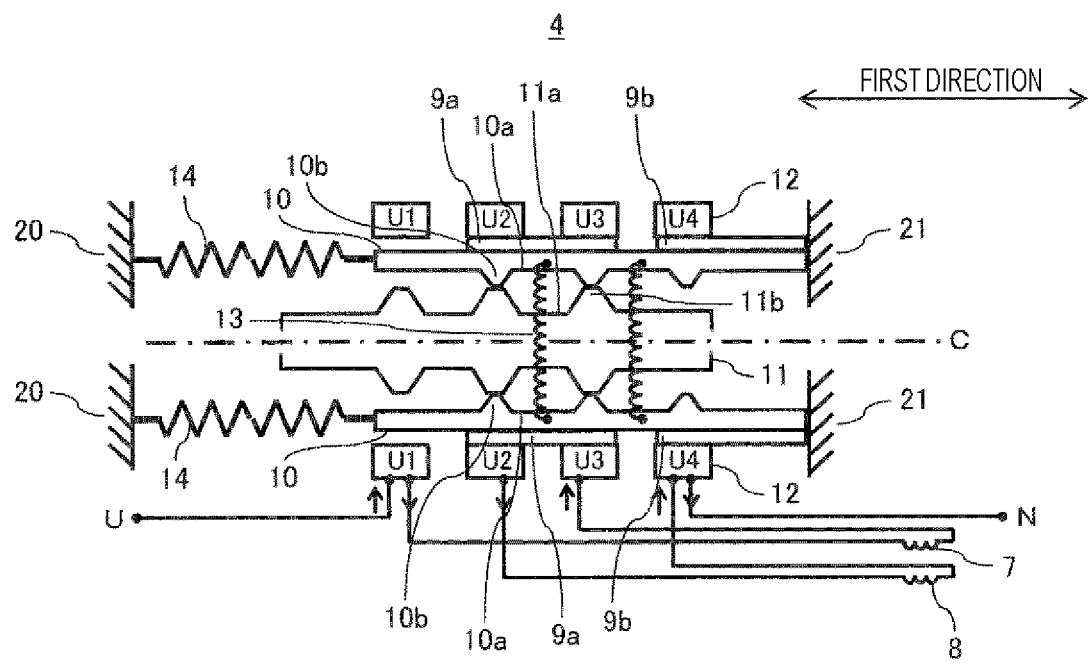
FIG. 12 is a configuration diagram of a main part of a winding switching device according to the third embodiment (series connection).

FIG. 10 is a configuration diagram of a main part of a winding switching device 4 according to the third embodiment (the same applies to FIGS. 11 to 12). In FIG. 10, the U-phase first winding 7 and the U-phase second winding 8 are connected in parallel by the winding switching device 4 as in FIG. 7.

FIG. 10 illustrates a U-phase winding switching unit in the winding switching device 4 (the same applies to FIGS. 11 to 12). The configurations of the V-phase winding switching unit and the W-phase winding switching unit are similar to the configuration of the U-phase winding switching unit.

As illustrated in FIG. 10, the pressing spring 14 is connected between one end on the fixed terminal electrode U1 side of both ends in the first direction of the movable element 10 and a fixed unit of the winding switching device 4, for example, a support portion 20 such as a frame body that supports the movable element 10 and the stator 11.

A biasing force of the pressing spring 14 is applied to the movable element 10 in a direction from the movable short-circuit portion 9a toward movable short-circuit portion 9b, that is, in the first direction and the right direction in the drawing (the same applies to FIGS. 11 to 12). In addition, external power F is applied to the movable element 10 in a direction from the movable short-circuit portion 9b toward the movable short-circuit portion 9a, that is, in the first direction and the left direction in the drawing. Thus, the direction of the biasing force of the pressing spring 14 and the direction of the external power F are opposite to each other.

In the state of FIG. 10, the biasing force of pressing spring 14 and the external power F are substantially balanced, and the biasing force of pressing spring 14 and the external power F are balanced with the frictional force between the convex portion 10b of movable element 10 and the convex portion 11b of the stator 11. Therefore, the movable element 10 is stopped.

FIG. 11 is a configuration diagram of a main part of the winding switching device 4 according to the third embodiment. FIG. 11 illustrates a state of the winding switching device 4 in the middle of switching the connection between the U-phase first winding 7 and the U-phase second winding 8 from the parallel connection (FIG. 10) to the series connection (FIG. 12).

In the parallel connection state illustrated in FIG. 10, when the external power F is reduced, the biasing force of the pressing spring becomes larger than the external power F, and thus the driving force is applied to the movable element 10 in the right direction in FIG. 11, that is, in the direction from the movable short-circuit portion 9a toward the movable short-circuit portion 9b along the first direction. As a result, similarly to the second embodiment, the movable element 10 slides in the direction of the driving force.

FIG. 12 is a configuration diagram of a main part of the winding switching device 4 according to the third embodiment. In FIG. 12, the U-phase first winding 7 and the U-phase second winding 8 are connected in series.

In the state of FIG. 11, when the driving force is continuously applied to the movable element 10, as illustrated in FIG. 12, an end on a side opposite to one end to which the pressing spring 14 is connected of both ends of the movable element 10 abuts to a fixed unit of the winding switching device 4, for example, the support portion 21 such as a frame body that supports the movable element 10 and the stator 11. At this time, the movable element 10 is stopped, and the connection between the U-phase first winding 7 and the U-phase second winding 8 is switched to the series connection. Since movable element 10 is pressed against the support portion 21 by the biasing force of the pressing spring 14, the series connection state between the U-phase first winding 7 and the U-phase second winding 8 is held even if external power F is lost due to an abnormality of the operation device or the like.

In the series connection state illustrated in FIG. 12, when the external power F is increased, the driving force is applied to the movable element 10 in the left direction in FIG. 12, that is, the direction from the movable short-circuit portion 9b toward the movable short-circuit portion 9a along the first direction. As a result, the connection between the U-phase first winding 7 and the U-phase second winding 8 is switched from the series connection to the parallel connection.

In the winding switch of FIGS. 10 to 12, the position to which the pressing spring 14 is connected and the position to which the external power is applied in the movable element 10 may be exchanged. In this case, in the parallel connection state, the end of the movable element 10 abuts to the support portion 20, and the movable element 10 is pressed against the support portion 20 by the biasing force of the pressing spring 14. Therefore, even if the external power F is lost, the parallel connection state between the U-phase first winding 7 and the U-phase second winding 8 is held.

In addition, the direction of the external power F may be the first direction and the right direction in FIGS. 10 to 12, and the pressing spring 14 may be replaced with a tension spring and have the direction of the biasing force of the spring as the first direction and the left direction in FIGS. 10 to 12.

Fourth Embodiment

Figure 13:
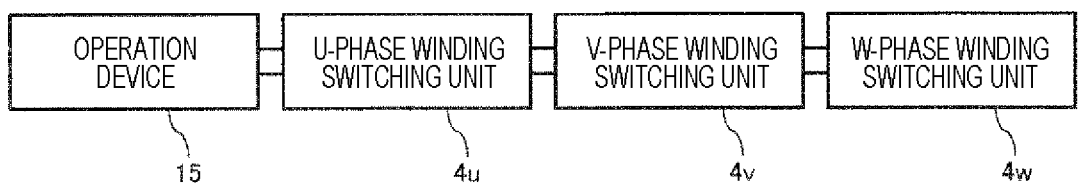
FIG. 13 is an overall configuration diagram of a winding switching device according to a fourth embodiment.

FIG. 13 is an overall configuration diagram of a winding switching device according to a fourth embodiment of the present invention.

As illustrated in FIG. 13, in the fourth embodiment, the U-phase winding switching unit 4u, the V-phase winding switching unit 4v, and the W-phase winding switching unit 4w are mechanically arranged in series. That is, the movable elements in each of the winding switching units are mechanically connected in series. Furthermore, the operation device 15 that drives the movable element is mechanically connected to the winding switching unit at one end of the series arrangement of the winding switching units for the three phases, that is, the movable element of the U-phase winding switching unit 4u in the fourth embodiment. Therefore, in the fourth embodiment, the U-phase winding switching unit 4u, the V-phase winding switching unit 4v, the W-phase winding switching unit 4w, and the operation device 15 are mechanically arranged in series.

In the fourth embodiment, any one of the winding switching units of the first to third embodiments is applied as each winding switching unit. As the operation device 15, for example, an electric operation device including a solenoid can be applied (the same applies to a fifth embodiment and a sixth embodiment to be described later). In this case, since an inexpensive operation device is applied, the cost of the winding switching device can be reduced.

According to the fourth embodiment, the winding switching device for a plurality of phase windings (the three-phase winding in the fourth embodiment) can be configured by the hoisting switching unit, that is, the hoisting switch of the unit (for one phase). Furthermore, since the plurality of winding switching units are arranged in series, the movable elements of the plurality of winding switching units can be simultaneously driven by one operation device 15. In addition, since the plurality of winding switching units are arranged in series, the winding switching device can be arranged in an elongated space.

Fifth Embodiment

Figure 14:
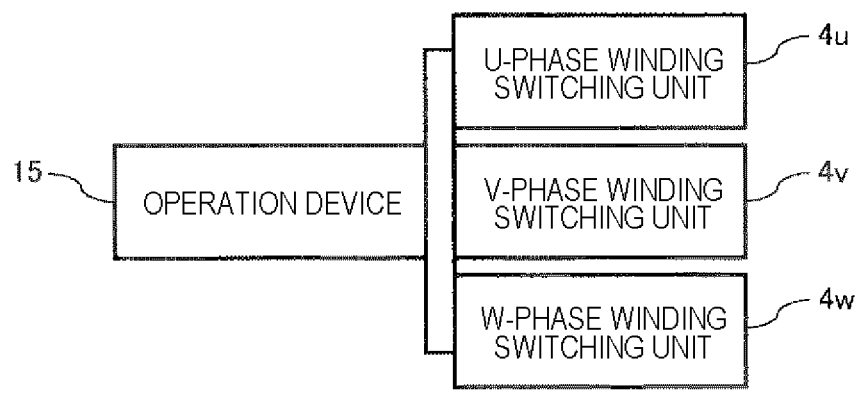
FIG. 14 is an overall configuration diagram of a winding switching device according to a fifth embodiment.

FIG. 14 is an overall configuration diagram of a winding switching device according to a fifth embodiment of the present invention.

As illustrated in FIG. 14, in the fifth embodiment, the U-phase winding switching unit 4u, the V-phase winding switching unit 4v, and the W-phase winding switching unit 4w are mechanically arranged in parallel. That is, the movable elements in each of the winding switching units are mechanically connected in parallel. In addition, the operation device 15 that drives the movable element is mechanically connected to the movable elements for three phases mechanically connected in parallel.

In the fifth embodiment, any one of the winding switching units of the first to third embodiments is applied as each winding switching unit.

According to the fifth embodiment, the winding switching device for a plurality of phase windings (the three-phase winding in the fourth embodiment) can be configured by the winding switching unit, that is, the hoisting switch of the unit (for one phase). Furthermore, since the plurality of winding switching units are arranged in parallel, the movable elements of the plurality of winding switching units can be simultaneously driven by one operation device 15. In addition, since the plurality of winding switching units are arranged in parallel, the winding switching device can be arranged in a short space or a wide space.

Sixth Embodiment

Figure 15:
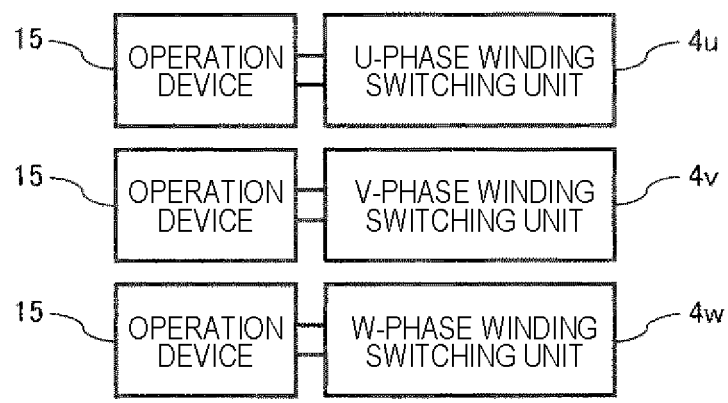
FIG. 15 is an overall configuration diagram of a winding switching device according to a sixth embodiment.

FIG. 15 is an overall configuration diagram of a winding switching device according to a sixth embodiment of the present invention.

In the sixth embodiment, the U-phase winding switching unit 4u, the V-phase winding switching unit 4v, and the W-phase winding switching unit 4w are mechanically arranged in parallel, but an independent operation device 15 is mechanically connected to the movable element of each winding switching unit.

According to the sixth embodiment, each of the plurality of winding switching units can be operated independently.

As a result, when one phase of the motor 5 (FIG. 1) fails, the operation can be continued with the two phases that have not failed. In addition, by switching the connection of the windings one phase at a time, the connection states of the windings can be switched while leaving the energized phase. Therefore, the motor 5 can be driven and controlled by the inverter 2 even at the time of winding switching.

Seventh Embodiment

In the winding switching device according to a seventh embodiment of the present invention, the tension spring 13 (see FIGS. 4, 7, and 10) in the first to sixth embodiments described above is replaced with a ring spring. By using a ring spring instead of the tension spring 13, the winding switching device can be made cylindrical, and the fixed terminal electrode group including the fixed terminal electrodes U1 to U4 can be made into a ring-shaped multipoint contact such as a so-called multi-ram band. In this case, movable short-circuit portions 9a, 9b also have a ring shape.

Here, the force with which the movable short-circuit portions 9a and 9b and the fixed terminal electrodes U1 to U4 press each other changes depending on gravity or the direction of acceleration (centrifugal force, acceleration/deceleration, vibration, etc.) received from the outside. On the other hand, according to the seventh embodiment, by forming the movable short-circuit portions 9a and 9b and the fixed terminal electrodes U1 to U4 into the ring shape, the movable short-circuit portions 9a and 9b and the fixed terminal electrodes U1 to U4 come into contact with each other in all radial directions of the ring, so that influence of gravity or acceleration received from the outside on the contact state can be alleviated.

Eighth Embodiment

Figure 17:
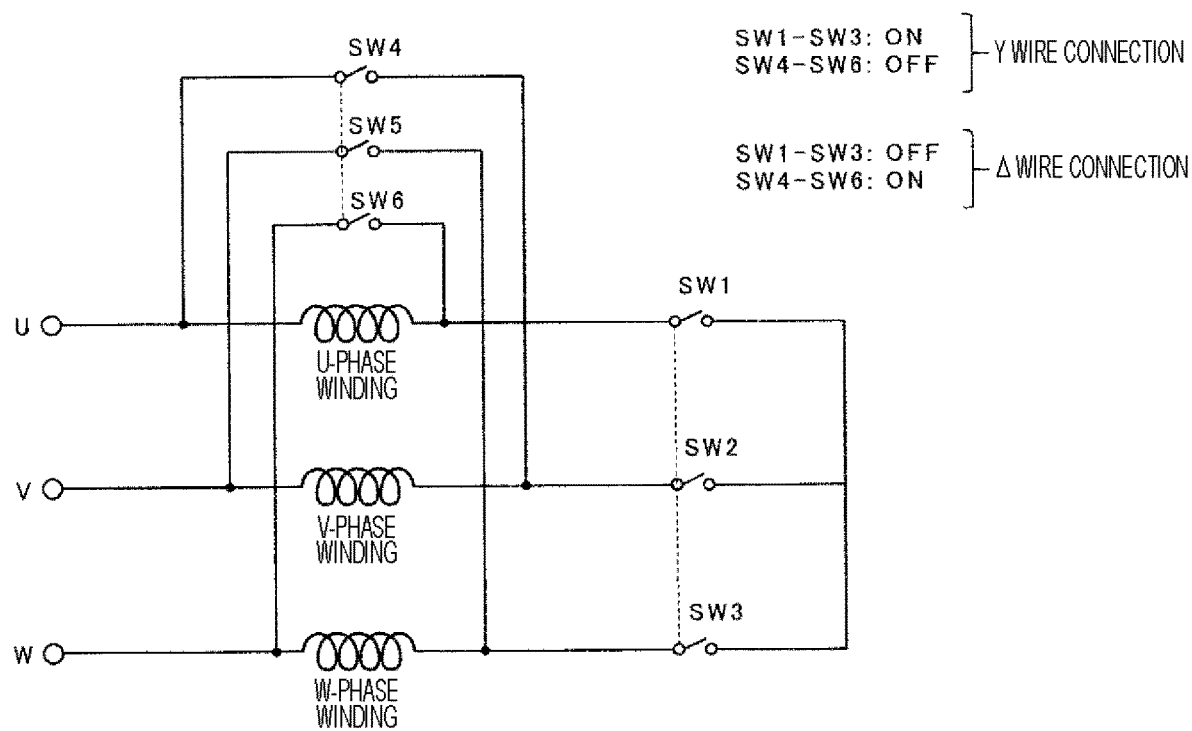
FIG. 17 is a circuit diagram illustrating a circuit configuration example of a winding switching device according to an eighth embodiment.

FIG. 17 is a circuit diagram illustrating a circuit configuration example of a winding switching device according to an eighth embodiment of the present invention.

In the eighth embodiment, the winding switch sets the wire connection state of the three-phase winding of the motor 5 to either the Y wire connection or the Δ wire connection, and switches from one of the Y wire connection and the Δ wire connection to the other. In addition, in the eighth embodiment, Y wire connection and Δ wire connection are adopted instead of the series connection and the parallel connection of the unit phase windings in each embodiment described above. That is, the efficiency of the inverter 2 when the motor 5 is driven at a low speed is improved by the Y wire connection, and the efficiency of the inverter 2 when the motor 5 is driven at a high speed is improved by the Δ wire connection.

As illustrated in FIG. 17, the winding switching device of the eighth embodiment includes switches SW1 to SW6.

The SW1 opens and closes an electrical connection between one end of the U-phase winding and a neutral point. The SW2 opens and closes an electrical connection between one end of the V-phase winding and the neutral point. The SW3 opens and closes an electrical connection between one end of the W-phase winding and the neutral point.

The SW4 opens and closes an electrical connection between the other end of the U-phase winding electrically connected to the U-phase terminal and one end of the V-phase winding. The SW5 opens and closes an electrical connection between the other end of the V-phase winding electrically connected to the V-phase terminal V and one end of the W-phase winding. The SW6 opens and closes an electrical connection between the other end of the W-phase winding electrically connected to the W-phase terminal W and one end of the U-phase winding.

SW1 to SW3 are turned ON and OFF in conjunction with each other. In addition, SW4 to SW6 are turned ON and OFF in conjunction with each other.

When the switches SW1 to SW3 are turned ON and the switches SW4 to SW6 are turned OFF, the wire connection state of the three-phase windings (U-phase winding, V-phase winding, W-phase winding) becomes the Y wire connection. When the switches SW1 to SW3 are turned OFF and the switches SW4 to SW6 are turned ON, the wire connection state of the three-phase windings (U-phase winding, V-phase winding, W-phase winding) becomes the Δ wire connection.

Note that, although illustration is omitted, in the eighth embodiment, the arrangement of the movable short-circuit portion and the fixed terminal electrode and the connection state of each phase winding to the fixed terminal electrode and each phase terminal are appropriately changed so as to configure SW1 to SW6 in each of the above-described embodiments.

According to the eighth embodiment, the configuration of the winding switching device can be simplified while improving the efficiency of the variable speed operation system including the motor 5 and the inverter 2 by switching the windings.

In the eighth embodiment, the series connection and the parallel connection of the unit phase windings in each phase winding are respectively changed to the Y wire connection and the Δ wire connection, but this is not the sole case, and each phase winding may include two windings having different numbers of turns, where one with a larger number of turns (one with a larger impedance, inductance, or resistance) may be used instead of the series connection, and one with a smaller number of turns (one with a smaller impedance, inductance, or resistance) may be used instead of the parallel connection.

Note that the present invention is not limited to the embodiments described above, and includes various modified embodiments.

For example, the above-described embodiments have been described in detail for the sake of easy understanding of the present invention, and are not necessarily limited to those having all the described configurations. In addition, it is possible to add, delete, and replace other configurations for a part of the configuration of each embodiment.

For example, the motor 5 may be a winding field synchronous electric motor or an induction electric motor. Furthermore, the operation device 15 is not limited to the electric operation device, and may be a hydraulic operation device or the like.

In addition, the winding switching device in each of the embodiments described above is not limited to the EV driving variable speed operation system, and can be applied to a rotating electrical machine drive system in an electric railway vehicle or the like.

Note that the winding switch according to the present invention can be applied not only to a rotating electrical machine but also to an electrical device including a plurality of windings, such as various actuators and induction heating devices.

REFERENCE SIGNS LIST

1 power supply
2 inverter
3 switching control device
4 winding switching device
4*u* U-phase winding switching unit
4*v* V-phase winding switching unit
4*w* W-phase winding switching unit
5 motor
6 load device
7 U-phase first winding
8 U-phase second winding
9*a*, 9*b* movable short-circuit portion
10 movable element
10*a* concave portion
10*b* convex portion
11 stator
11*b* convex portion (regulating portion)
12 fixed conductor portion
13 tension spring
14 pressing spring
15 operation device
20, 21 support portion
N neutral point
U U-phase terminal
U1, U2, U3, U4 fixed terminal electrode

The invention claimed is:

1. A winding switching device that switches connection states of a plurality of windings, the winding switching device comprising:
   a plurality of electrodes to which the plurality of windings are connected;
   a movable unit that includes a plurality of conductor portions in contact with the plurality of electrodes, and that is driven in a predetermined direction in which the plurality of electrodes are arranged; and
   a fixed unit including a regulating portion that regulates movement of the movable unit in the predetermined direction,
   wherein the connection states of the plurality of windings are switched according to the position of the movable unit, and
   when the movable unit moves in the predetermined direction, the plurality of conductors are displaced in a direction of moving away from the plurality of electrodes by the regulating portion.

2. The winding switching device according to claim 1, wherein the regulating portion regulates movement of the movable unit in the predetermined direction when the conductor portion and the electrode are brought into contact with each other.

3. The winding switching device according to claim 1, wherein the movable unit is driven by external power.

4. The winding switching device according to claim 3, further comprising a spring that biases the movable unit.

5. The winding switching device according to claim 4, wherein a direction of the biasing force of the spring and a direction of the external power are opposite to each other.

6. The winding switching device according to claim 1, wherein external power for driving the movable unit is applied by an operation device including a solenoid.

7. A winding switching device comprising a plurality of winding switching units for switching a connection state of a plurality of windings,
   wherein the winding includes a plurality of unit windings, the winding switching unit switches connection states of the plurality of unit windings, and includes
   a plurality of electrodes to which the plurality of unit windings are connected,
   a movable unit that includes a plurality of conductor portions in contact with the plurality of electrodes, and that is driven in a predetermined direction in which the plurality of electrodes are arranged, and
   a fixed unit including a regulating portion that regulates movement of the movable unit in the predetermined direction,
   the connection states of the plurality of unit windings are switched according to the position of the movable unit, and
   when the movable unit moves in the predetermined direction, the plurality of conductors are displaced in a direction of moving away from the plurality of electrodes by the regulating portion.

8. The winding switching device according to claim 7, wherein the plurality of winding switching units are mechanically connected in series.

9. The winding switching device according to claim 7, wherein the plurality of winding switching units are mechanically connected in parallel.

10. The winding switching device according to claim 7, wherein power for driving the movable unit is applied to each of the plurality of winding switching units.

11. The winding switching device according to claim 1, wherein the plurality of windings are a plurality of phase windings included in a rotating electrical machine.

12. A rotating electrical machine drive system including a rotating electrical machine, the rotating electrical machine drive system comprising:
   an inverter that outputs AC power to the rotating electrical machine; and
   a winding switching device connected between the rotating electrical machine and the inverter,
   wherein the winding switching device is the winding switching device according to claim 1.

* * * * *